C. C. MOHNEY.
POWER ATTACHMENT FOR AUTOMOBILE HAND PUMPS.
APPLICATION FILED SEPT. 14, 1920.

1,376,713.  Patented May 3, 1921.

WITNESSES

INVENTOR
Charles C. Mohney.
ATTORNEYS

UNITED STATES PATENT OFFICE.

CHARLES CLYDE MOHNEY, OF CLINTONVILLE, PENNSYLVANIA.

POWER ATTACHMENT FOR AUTOMOBILE HAND-PUMPS.

1,376,718.   Specification of Letters Patent.   Patented May 3, 1921.

Application filed September 14, 1920. Serial No. 410,151.

*To all whom it may concern:*

Be it known that I, CHARLES CLYDE MOHNEY, a citizen of the United States, and resident of Clintonville, in the county of Venango and State of Pennsylvania, have invented new and useful Improvements in Power Attachments for Automobile Hand-Pumps, of which the following is a specification.

My invention is an improvement in pumps and has for its object to provide mechanism for use in connection with automobile hand pumps of any character, having means for connecting said pump to a motor vehicle in such manner that when the wheels are driven by the engine, the pump will be operated, the pump being connected with the running board and one of the rear wheels.

Figure 1:
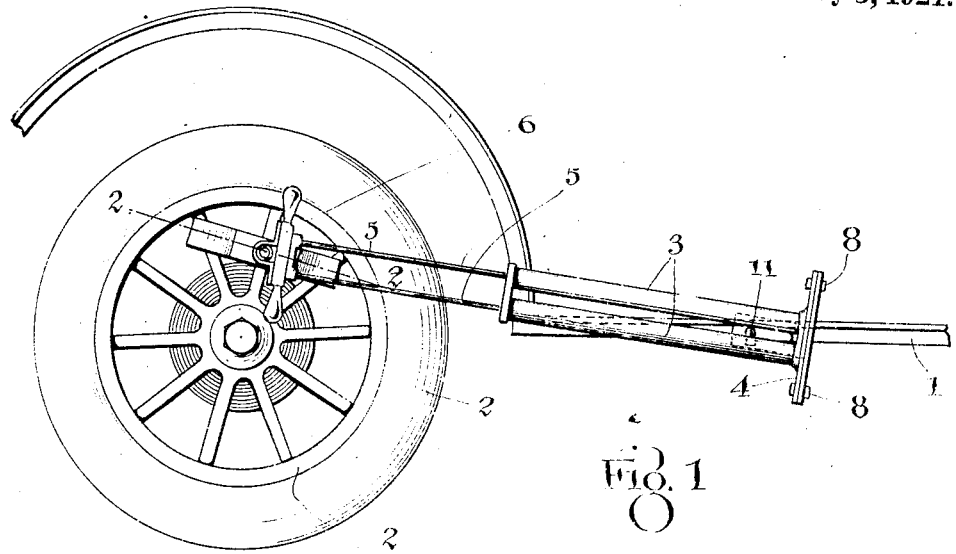
Figure 1 is a side view of a portion of a motor vehicle, showing the pump in place.

In the present embodiment of the invention, the pump is shown arranged between the running board 1 of a motor vehicle and one of the rear wheels 2 thereof. The pump, which in the present instance is a two cylinder pump, comprising the usual barrels 3, the foot 4, and the plungers within the barrels on the plunger rods 5, which are connected by the handle 6. The barrels of the pump may be connected with a suitable place of storage, as for instance a tank or reservoir, or the said barrels may be connected directly with the tires.

For connecting the foot or base of the pump to the running board, I provide an angle bracket, consisting of a portion 7, which fits against the bottom of the foot plate 4, and is bolted thereto as shown at 8, and a portion 9, which extends upwardly alongside the barrels.

The portion 7 has openings at its ends for receiving the bolts 8, and the portion 9 is slotted or recessed longitudinally as shown at 10, to receive an angle pin 11, which extends outwardly from the running board.

Figure 4:
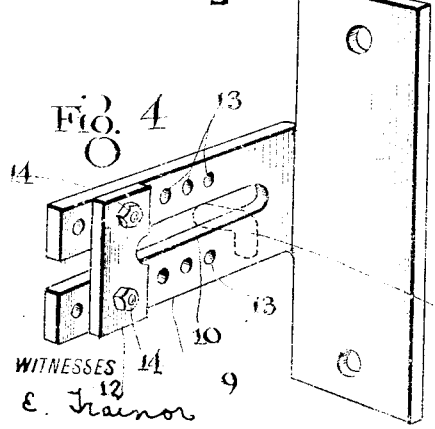
Fig. 4 is a view of the angle bracket for connecting the foot of the hand pump to the running board.
Figure 5:
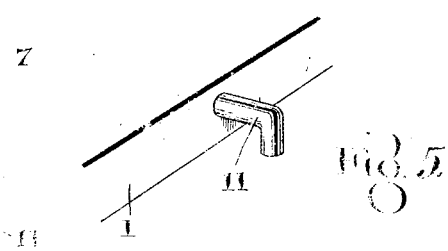
Fig. 5 is a perspective view of the edge of the running board showing the pin on which the pump swings.

A plate 12 is arranged transversely of the slot 10, and this plate has openings at its ends, which are adapted to register with openings of series 13 in the portion 9 of the angle bracket, and at each side of the slot 10. Bolts 14 are passed through the registering openings and are engaged by nuts to hold the parts in adjusted position. Referring to Fig. 4, it will be seen that the inner edge of the plate 12 is notched at the slot 10.

In order to connect the handle 6 to the wheel, I provide a block 15, having a facing of cushioned material 16, on one face, as for instance, felt or the like, and I connect the block to the wheel by means of a rod 17, which extends through an opening intermediate the ends of the block, and is provided with a hook 18, at the face of the block, adjacent to the facing 16. This rod is threaded adjacent to the hook, and the threaded portion is engaged by a handle nut 19, for clamping the block to the wheel. A washer 20 is arranged between the nut and the adjacent face of the block.

Figure 2:
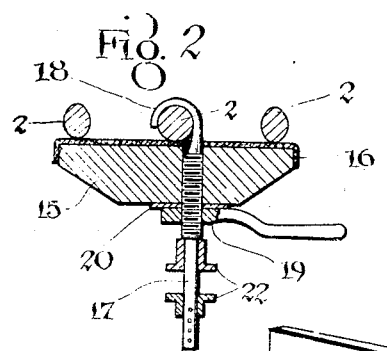
Fig. 2 is a section taken substantially on line 2—2 of Fig. 1.
Figure 3:
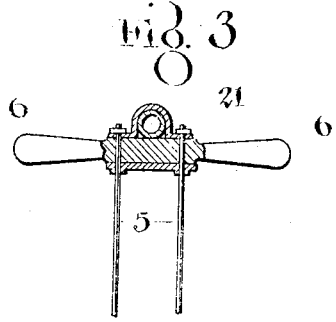
Fig. 3 is a sectional view in a plane at right angles to that of Fig. 2.

A clip 21 of substantially U-shape is connected to the handle on the face remote from the pump, and this clip is adapted to engage the bolt 17, between washers 22 on the bolt. Referring to Fig. 2, it will be seen, that that end of the bolt remote from the hook, has a series of openings for receiving a cotter pin, for preventing disengagement of the handle.

In operation, when it is desired to fill the reservoir, or to pump up the tires, the angle pin 11 is engaged with the slot 10, the plate 12 being adjusted so that when the handle is connected with the wheel eccentrically thereof, the plungers of the pump will be reciprocated to proper strokes when the wheel rotates. The provision of the plate 12 provides for some sliding movement of the pump, and is a lost motion connection. After the block 15 is connected with the wheel, it will be noticed referring to Figs. 1 and 2, that the said block is of a length to engage 3 spokes. After the block has been clamped on the wheel, the handle 6 is connected therewith, and the pump is ready for operation.

The block 15 is about 2 inches thick at its center, about 10 inches long, and tapers to about ½ inch to its ends.

The felt facing prevents marring of the wheel. With the improvement attached to the pump, there is no interference with the function of the pump, as a hand pump, since the portion 7 of the angle bracket does not interfere with the placing of the foot plate directly on the floor. It will be understood that as a rule the rear wheel will be jacked up when the pump is in use. The washers 22 have tubular hubs which space the handle well out from the wheel, and this arrangement permits the adjustment for any make of hub. The lost motion connection between the pump body and the car is necessary, because some pumps have as little as a 13 inch stroke, while others have a 20 to a 22 inch stroke. On the other hand, some cars have a brake drum of great diameter, while others have a drum of small diameter. The size of the drum determines the point at which the block 15 must be placed, and the consequent stroke given by the rotation of the wheel.

I claim:

1. In combination with a pump having means for connecting the foot plate thereof to the running board of a motor vehicle, with a lost motion and swinging connection, and means for rotatably connecting the handle of the pump to the wheel eccentrically thereof, said first named means comprising an angle bracket having a portion connected with the foot plate, and a portion extending longitudinally of the pump, and longitudinally slotted, an angle pin for connection with a motor vehicle, and adapted to engage the slot slidably, and means for varying the length of this slot.

2. In combination with a pump having means for connecting the foot plate thereof to the running board of a motor vehicle, with a lost motion and swinging connection, and means for rotatably connecting the handle of the pump to the wheel eccentrically thereof, said last named means comprising a block having a face of cushioning material, and of a length to engage a number of spokes, and means for clamping the block to the spokes of the wheels, and means for rotatably connecting the pump handle to the block.

3. In combination with a pump of means for connecting the foot plate thereof to the running board of a motor vehicle, means for rotatably connecting the handle of the pump to the wheel, eccentrically thereof, and means in connection with the first named means for adjusting the pump to provide for strokes of various lengths.

4. In combination with a pump having means for connecting the foot plate thereof to the running board of a motor vehicle, with a lost motion and swinging connection, and means for rotatably connecting the handle of the pump to the wheel eccentrically thereof.

5. In combination with a hand pump, of means for connecting the same to the running board of a motor vehicle, means for rotatably connecting the handle of the pump to the wheel of the vehicle eccentrically, and means in connection with the first named means for adjusting the pump to provide for strokes of various lengths.

6. In combination with a hand pump, of means for connecting the same to the running board of a motor vehicle with a lost motion and swinging connection, and means for rotatably connecting the handle of the pump to the wheel eccentrically.

CHARLES CLYDE MOHNEY.